US010207339B2

(12) United States Patent
Park et al.

(10) Patent No.: US 10,207,339 B2
(45) Date of Patent: Feb. 19, 2019

(54) CUTTING INSERT FOR INDEXABLE DRILL

(71) Applicant: KORLOY INC, Seoul (KR)

(72) Inventors: Chan Kyu Park, Cheongju-si (KR); Hong Seung Son, Cheongju-si (KR); Sung Hyun Kim, Cheongju-si (KR); Hyo Joon Lim, Cheongju-si (KR); Sun Yong Ahn, Cheongju-si (KR); Young Heum Kim, Cheongju-si (KR)

(73) Assignee: KORLOY INC, Seoul (KR)

( * ) Notice: Subject to any disclaimer, the term of this patent is extended or adjusted under 35 U.S.C. 154(b) by 226 days.

(21) Appl. No.: 15/037,579

(22) PCT Filed: Nov. 7, 2014

(86) PCT No.: PCT/KR2014/010669
§ 371 (c)(1),
(2) Date: May 18, 2016

(87) PCT Pub. No.: WO2015/088144
PCT Pub. Date: Jun. 18, 2015

(65) Prior Publication Data
US 2016/0297011 A1 Oct. 13, 2016

(30) Foreign Application Priority Data
Dec. 9, 2013 (KR) .................. 10-2013-0152488

(51) Int. Cl.
*B23B 51/02* (2006.01)
*B23B 51/04* (2006.01)
*B23B 27/14* (2006.01)

(52) U.S. Cl.
CPC .......... *B23B 51/048* (2013.01); *B23B 27/141* (2013.01); *B23B 27/145* (2013.01);
(Continued)

(58) Field of Classification Search
CPC .......... B23B 2251/50; B23B 2200/204; B23B 2200/0447; B23B 2200/0471; B23B 27/141; B23B 27/145; Y10T 407/23
See application file for complete search history.

(56) References Cited

U.S. PATENT DOCUMENTS 5,049,011 A * 9/1991 Bohnet ................. B23B 27/141
408/199
5,158,402 A * 10/1992 Satran .................... B23C 5/202
407/113
(Continued)

FOREIGN PATENT DOCUMENTS

JP 59-196107 A * 11/1984 ............. B23B 51/00
JP 11-104911 A * 4/1999 ............. B23B 51/00
(Continued)

OTHER PUBLICATIONS

International Search Report dated Jan. 21, 2015 issued in PCT/KR2014/010669.

*Primary Examiner* — Ryan C Rufo
(74) *Attorney, Agent, or Firm* — Scully Scott Murphy & Presser

(57) ABSTRACT

A cutting insert for an indexable drill according to the present disclosure may be used for external cutting or internal cutting depending on a position and a direction in which the cutting insert is installed even though a single type of cutting insert is provided. In addition, the cutting insert for an indexable drill according to the present disclosure has a section of the internal cutting edge which is involved in a cutting process or a section of the internal cutting edge which is not involved in the cutting process, which are clearly distinguished from each other, and as a result, the cutting insert may be rotated and mounted, and reversed and
(Continued)

mounted on a drill body, such that maximum eight corners may be used to perform a cutting process.

9 Claims, 9 Drawing Sheets

(52) U.S. Cl.
CPC . *B23B 2200/0409* (2013.01); *B23B 2200/085* (2013.01); *B23B 2200/204* (2013.01)

(56) References Cited

U.S. PATENT DOCUMENTS

| 5,486,073 | A | * | 1/1996 | Satran | B23C 5/109 |
|---|---|---|---|---|---|
| | | | | | 407/113 |
| 5,695,303 | A | * | 12/1997 | Boianjiu | B23B 27/141 |
| | | | | | 407/114 |
| 5,904,450 | A | * | 5/1999 | Satran | B23C 5/202 |
| | | | | | 407/113 |
| 6,783,306 | B2 | * | 8/2004 | Popke | B23C 5/207 |
| | | | | | 407/113 |
| 8,096,735 | B2 | * | 1/2012 | Sladek | B23C 5/2208 |
| | | | | | 407/113 |
| 2003/0223832 | A1 | * | 12/2003 | Roman | B23B 27/145 |
| | | | | | 408/224 |
| 2003/0223833 | A1 | * | 12/2003 | Roman | B23B 27/141 |
| | | | | | 408/224 |
| 2007/0071560 | A1 | * | 3/2007 | Karonen | B23B 27/16 |
| | | | | | 407/34 |
| 2007/0269278 | A1 | * | 11/2007 | Scherbarth | B23C 5/202 |
| | | | | | 407/114 |
| 2008/0075547 | A1 | * | 3/2008 | Wolf | B23B 27/141 |
| | | | | | 408/147 |
| 2009/0245949 | A1 | * | 10/2009 | Takahashi | B23B 27/145 |
| | | | | | 407/42 |
| 2010/0150671 | A1 | * | 6/2010 | Oprasic | B23C 5/207 |
| | | | | | 407/42 |
| 2010/0272526 | A1 | * | 10/2010 | Dufour | B23B 27/141 |
| | | | | | 407/114 |
| 2013/0022422 | A1 | * | 1/2013 | Ramesh | B23B 51/048 |
| | | | | | 408/200 |
| 2013/0022423 | A1 | * | 1/2013 | Ramesh | B23B 51/048 |
| | | | | | 408/200 |

FOREIGN PATENT DOCUMENTS

| JP | 2001-269808 | A | * | 10/2001 | | B23B 51/00 |
|---|---|---|---|---|---|---|
| JP | 2003-165009 | A | * | 6/2003 | | B23B 51/00 |
| JP | 2013-022728 | A | * | 2/2013 | | B23B 51/00 |
| KR | 10-0289094 | B1 | | 5/2001 | | |
| KR | 20040021197 | A | | 3/2004 | | |
| KR | 20100070296 | A | | 6/2010 | | |
| KR | 10-1014122 | B1 | | 2/2011 | | |
| KR | 10-1064768 | B1 | | 9/2011 | | |
| KR | 20120082824 | A | | 7/2012 | | |
| KR | 20130011950 | A | | 1/2013 | | |
| SU | 1458091 | A1 | * | 2/1989 | | B23B 27/00 |

* cited by examiner

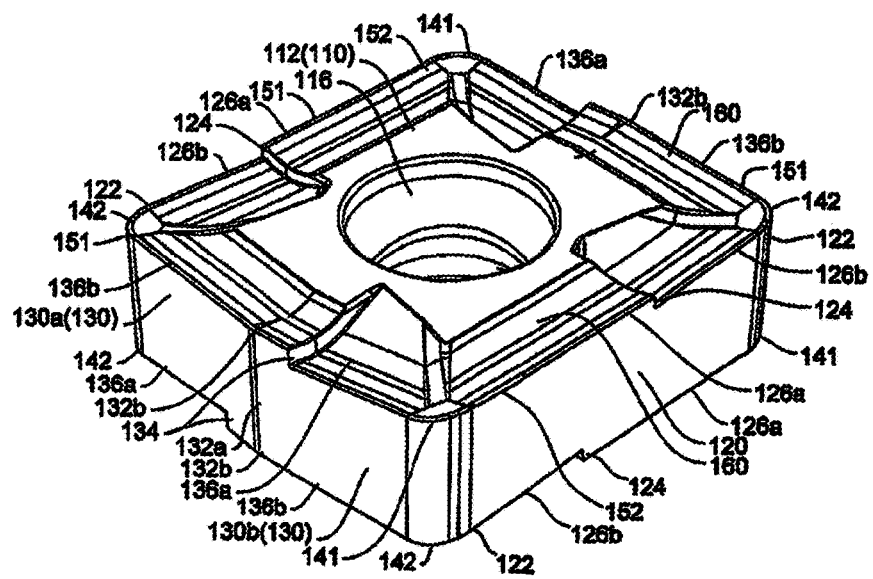
[Fig. 1]

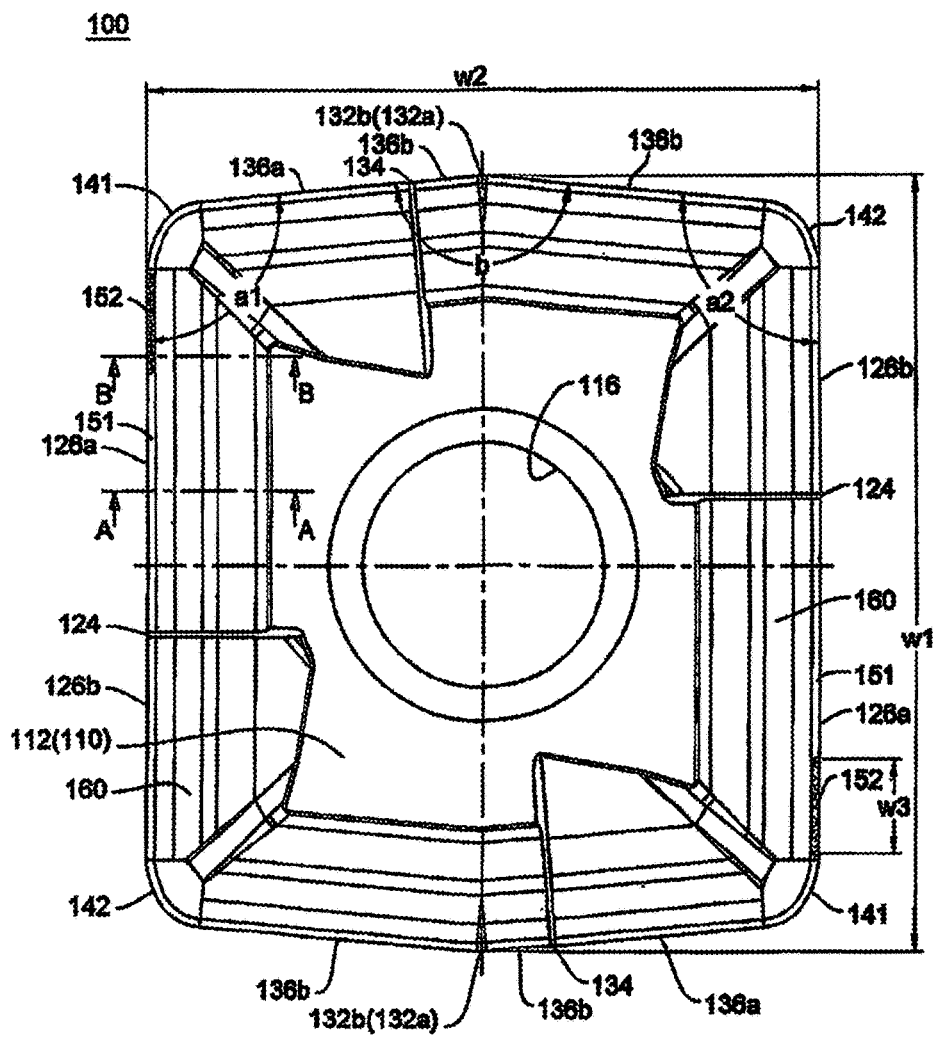
[Fig. 2]

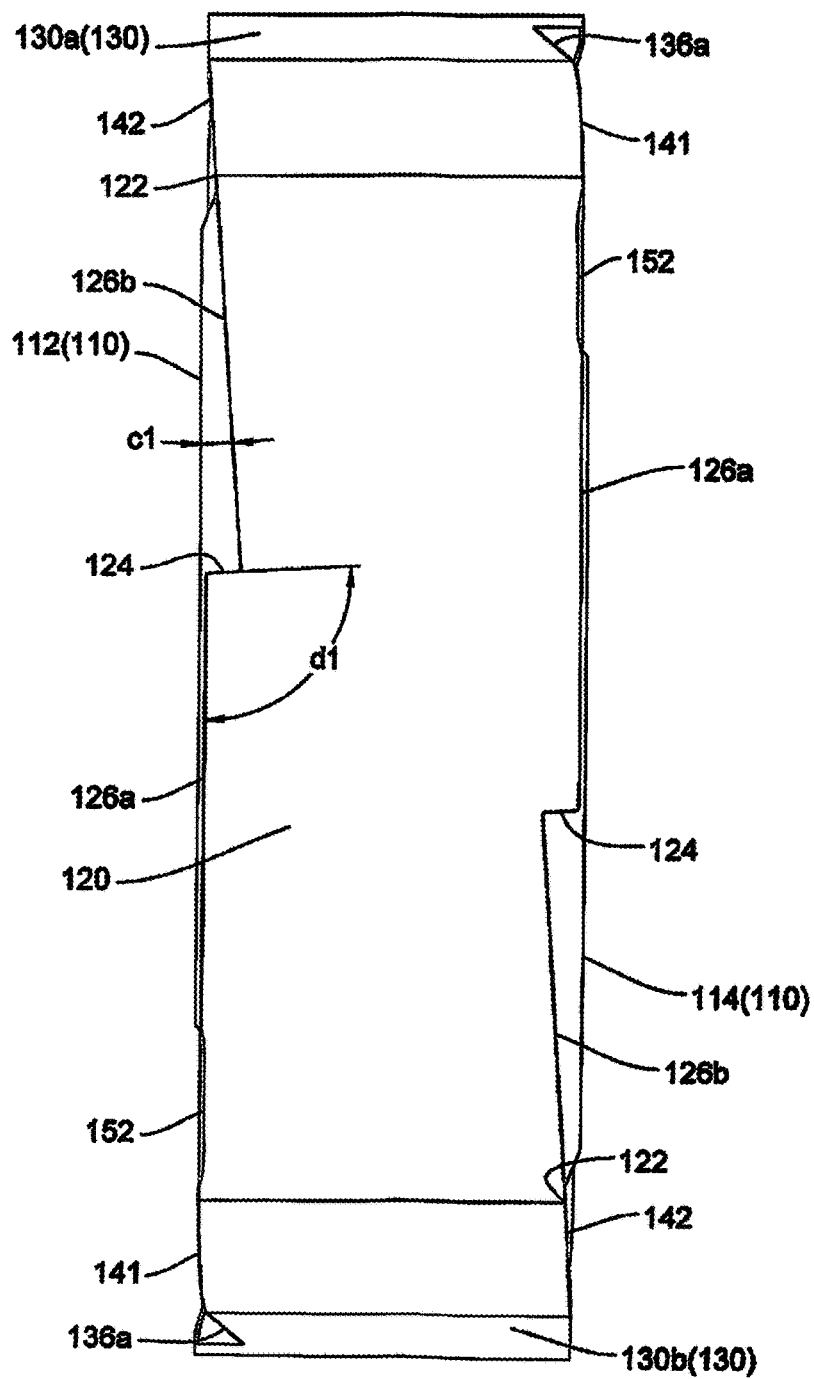
[Fig. 3]

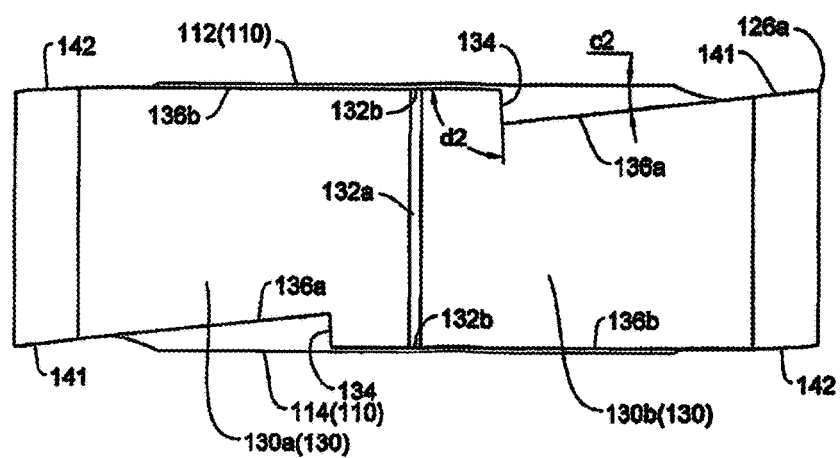
[Fig. 4]
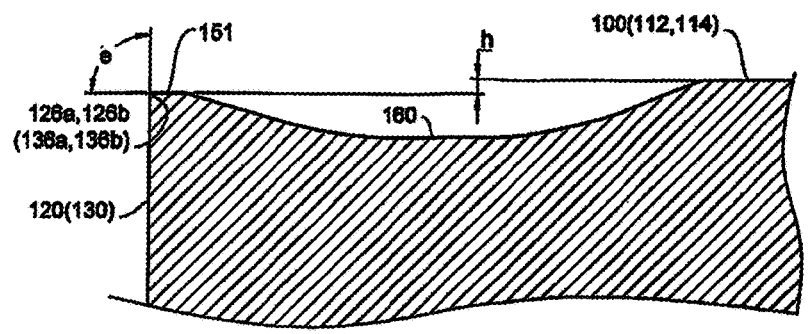
[Fig. 5]

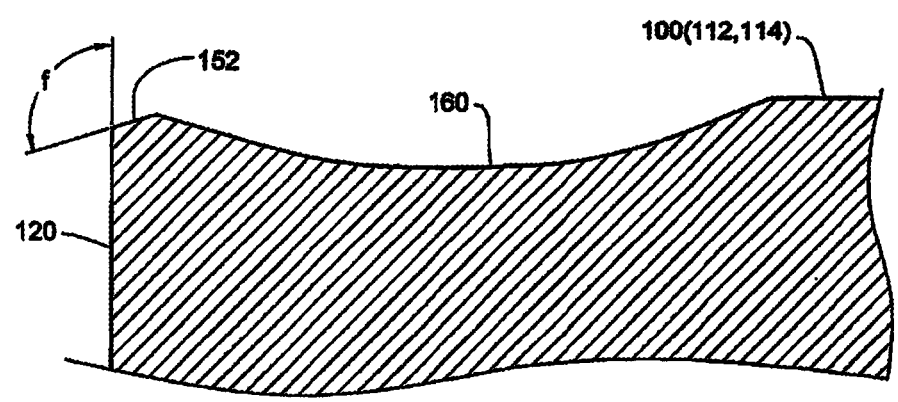
[Fig. 6]

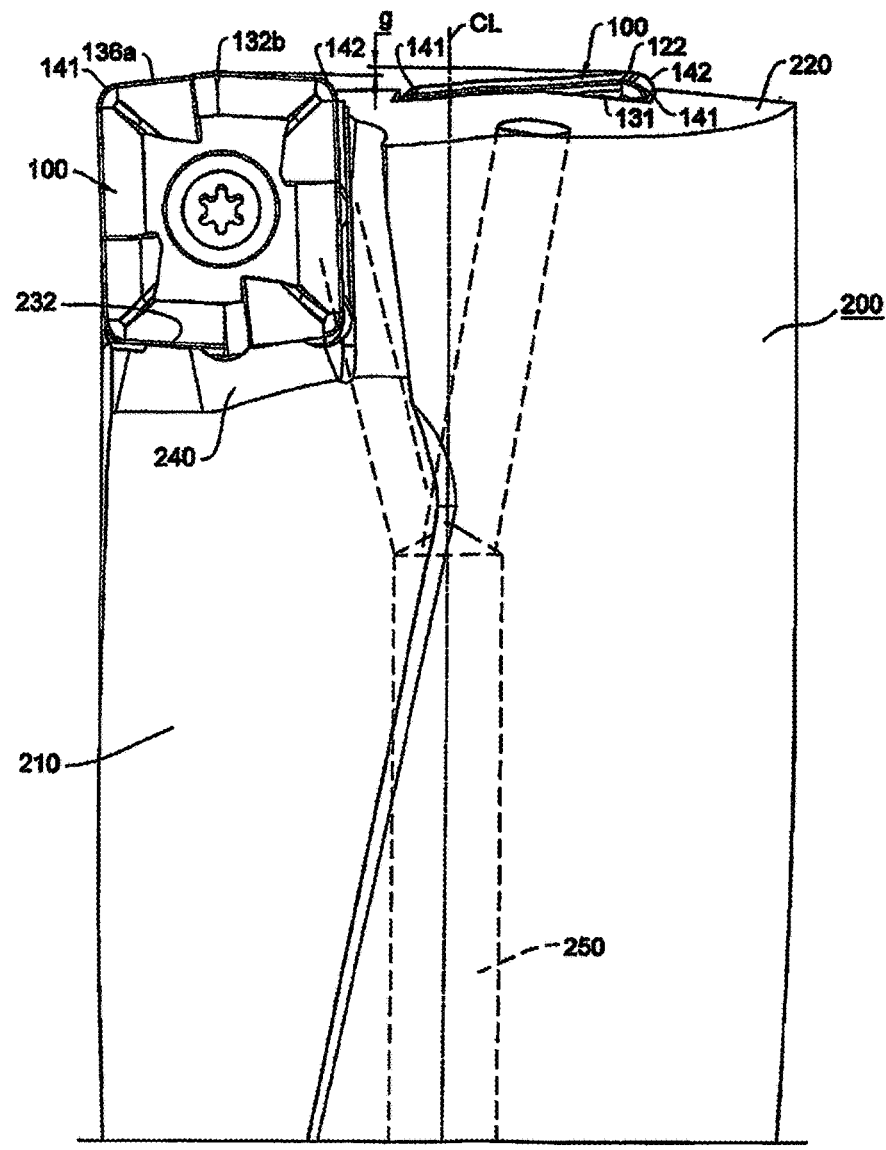
[Fig. 7]

(A) BEFORE FIRST AND SECOND INTERNAL CUTTING EDGES ARE ROTATED
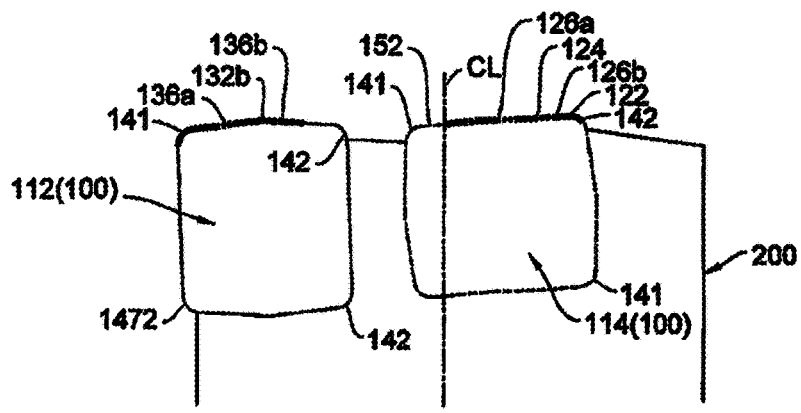
(B) AFTER FIRST AND SECOND INTERNAL CUTTING EDGES ARE ROTATED BY 180° ABOUT CENTERLINE CL
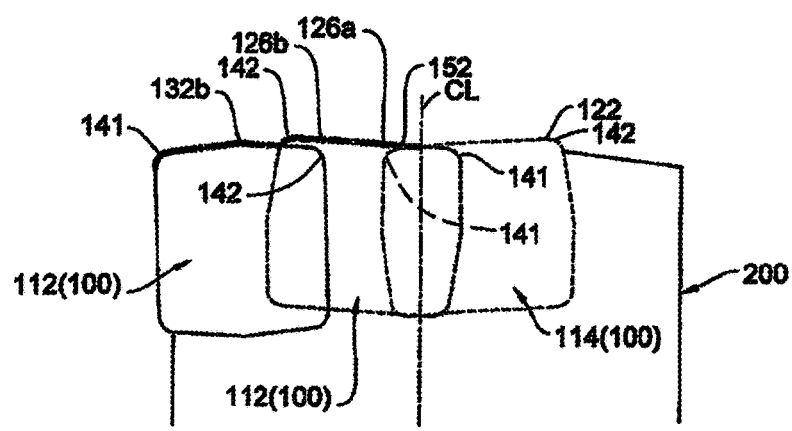
[Fig. 8]

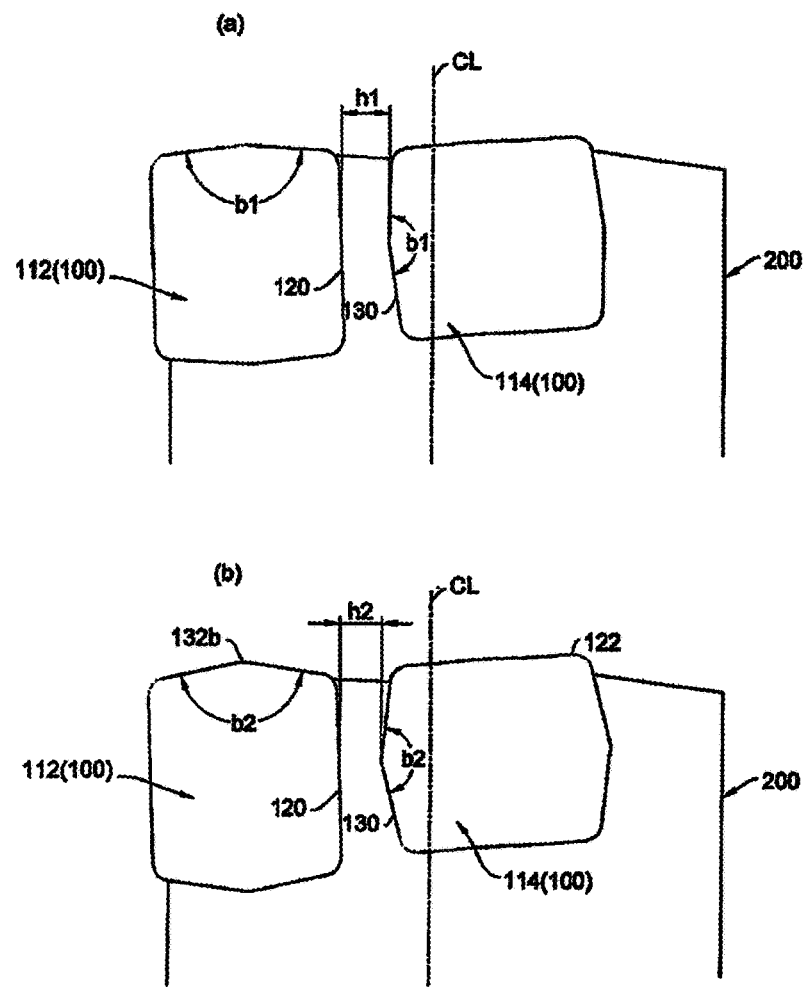
[Fig.9]

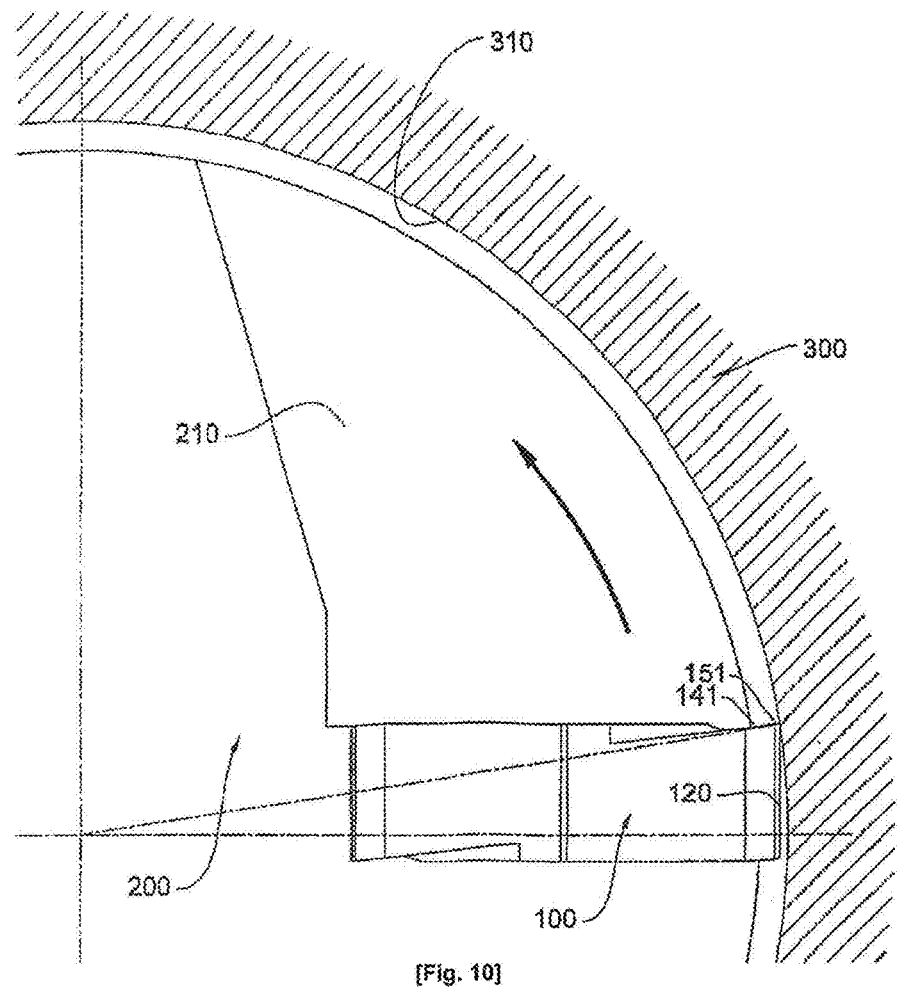
[Fig. 10]
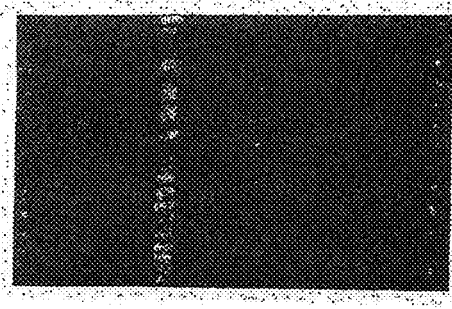
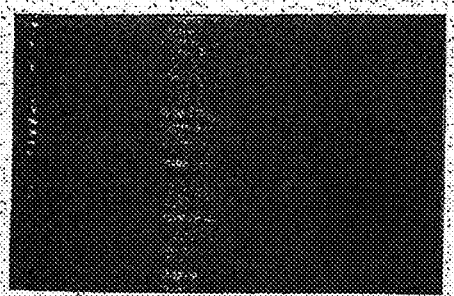
[Fig. 11]

CUTTING INSERT FOR INDEXABLE DRILL

TECHNICAL FIELD

The present disclosure relates to a cutting insert for an indexable drill, and more particularly, to a cutting insert for an indexable drill, which is installed on an indexable drill and performs a cutting process when processing a hole in a workpiece.

BACKGROUND ART

An indexable drill is a cutting tool which is configured on a tool body so as to replace and mount a cutting insert, and used to process a hole in a workpiece.

In general, in order to improve cutting performance, the indexable drill adopts a structure in which an oil hole is formed in a tool body, and cutting oil is supplied to the oil hole.

Meanwhile, the indexable drill has a structure in which a plurality of cutting inserts is installed. In this case, the plurality of cutting inserts may sometimes include different types of cutting inserts. In more detail, an internal cutting insert is disposed adjacent to a centerline CL, and an external cutting insert is disposed adjacent to an outer circumferential surface of the indexable drill.

As described above, since two or more types of cutting inserts, such as the internal cutting insert and the external cutting insert, are mounted on the indexable drill in the related art, there is an inconvenience of having to handle the plurality of cutting inserts.

On the other hand, it is proposed that a plurality of cutting edges for performing a cutting process may be used for the cutting insert, and the type of product may be named based on the number of available cutting edges.

For example, Korean Patent Application Laid-Open No. 10-2012-0082824 discloses that maximum six cutting edges may be used for the cutting insert. Since the six cutting edges are used for the cutting insert in the related art, the cutting insert may be named a 6-corner product.

However, the 6-corner product in the related art has a problem in that an inclination angle RR in a radial direction is a minus (−) angle that is greatly applied, and as a result, a cutting load is large.

In addition, there is a problem in that the cutting insert, which has the inclination angle RR in the radial direction which is a minus (−) angle that is greatly applied, degrades surface roughness of a surface to be processed.

LITERATURE OF RELATED ART

Patent Literature (Patent Literature 1) Korean Patent Application Laid-Open No. 10-2012-0082824 (Jul. 24, 2012)
(Patent Literature 2) Korean Patent Application Laid-Open No. 10-2004-0021197 (Mar. 10, 2004)
(Patent Literature 3) Korean Patent No. 10-1014122 (Feb. 1, 2011)

DISCLOSURE

Technical Problem

Therefore, a technical problem to be solved by the present disclosure is to provide a cutting insert for an indexable drill, which may be provided and mounted on an indexable drill as a single type, and may perform both an internal cutting function and an external cutting function by being mounted after changing a direction in which the cutting insert is disposed.

Another object of the present disclosure is to provide a cutting insert for an indexable drill, which may further improve quality of a cutting process.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

To solve the aforementioned technical problems, a cutting insert for an indexable drill according to the present disclosure includes: reference surfaces 110 which a fastening hole 116 penetrates; internal side surfaces 120 which are formed at both left and right sides in a top plan view illustrating a front side of the reference surface 110 and have a first width w1; and external side surfaces 130 which are formed at both upper and lower sides in a top plan view illustrating the front side of the reference surface 110 and have a second width w2, wherein internal transition cutting edges 124 are formed at edges of the internal side surfaces 120, first and second internal cutting edges 126a and 126b are formed at both sides based on the internal transition cutting edges 124, external point edges 132a are formed at centers of the external side surfaces 130, first and second external side surfaces 130a and 130b are formed at both sides based on the external point edges 132a, external transition cutting edges 134 are formed at edges of the first external side surfaces 130a, first and second external cutting edges 136a and 136b are formed at both sides based on the external transition cutting edges 134, a first angle a1 formed between the first internal cutting edge 126a and the first external cutting edge 136a is equal to a second angle a2 formed between the second internal cutting edge 126b and the second external cutting edge 136b in a top plan view illustrating the front side of the reference surface 110, and the reference surface 110, the internal side surface 120, and the external side surface 130 have the same shape before and after rotating the cutting insert by 180°, and have the same shape before and after reversing the front and rear sides of the cutting insert.

In addition, in the cutting insert for an indexable drill according to the exemplary embodiment of the present disclosure, the first width w1 and the second width w2 may be different from each other.

In addition, in the cutting insert for an indexable drill according to the exemplary embodiment of the present disclosure, the first width w1 may be larger than the second width w2.

In addition, in the cutting insert for an indexable drill according to the exemplary embodiment of the present disclosure, a ratio between the first width w1 and the second width w2 may be 1:1.05 to 1:1.3.

In addition, in the cutting insert for an indexable drill according to the exemplary embodiment of the present disclosure, in a side view illustrating a front side of the internal side surface 120, the reference surface 110 may be formed to be higher than the first and second internal cutting edges 126a and 126b or the first and second external cutting edges 136a and 136b.

In addition, in the cutting insert for an indexable drill according to the exemplary embodiment of the present disclosure, the first internal cutting edge 126a may have a flat land 151 that forms a right angle e with respect to the internal side surface 120, and a negative land 152, which forms a first obtuse angle f with respect to the internal side surface 120, may be formed in partial sections of the first internal cutting edge 126a.

In addition, in the cutting insert for an indexable drill according to the exemplary embodiment of the present disclosure, the partial sections in which the negative land 152 is formed may be disposed in the vicinity of a center line CL when a drill body 200 rotates based on the center line CL in a state in which a pair of cutting inserts 100 is installed on the drill body 200.

In addition, in the cutting insert for an indexable drill according to the exemplary embodiment of the present disclosure, a length w3 of the negative land 152 may be 0.05 to 0.3 times the first width w1.

In addition, in the cutting insert for an indexable drill according to the exemplary embodiment of the present disclosure, in a side view illustrating a front side of the external side surface 130, a third angle c, c1, or c2 formed between the first external cutting edge 136a and the reference surface 110 may be 2° to 15°.

In addition, in the cutting insert for an indexable drill according to the exemplary embodiment of the present disclosure, in a top plan view illustrating the front side of the reference surface 110, a fourth angle b formed between the first external side surface 130a and the second external side surface 130b may be 160° to 174°.

In addition, in the cutting insert for an indexable drill according to the exemplary embodiment of the present disclosure, the first and second angles a1 and a2 may be 93° to 100°.

In addition, in the cutting insert for an indexable drill according to the exemplary embodiment of the present disclosure, the internal transition cutting edge 124 may form twenty-first and twenty-second obtuse angles d1 with respect to the reference surface 110 in a side view illustrating a front side of the internal side surface 120, the external transition cutting edge 134 may form twenty-first and twenty-second obtuse angles d2 with respect to the reference surface 110 in a side view illustrating a front side of the external side surface 130, and the twenty-first and twenty-second obtuse angles d1 and d2 may be 90.5° to 178°.

Other detailed matters of the exemplary embodiment are included in the detailed description and the drawings.

Advantageous Effects

The cutting insert for an indexable drill according to the present disclosure, which is configured as described above, may perform an internal cutting function by being mounted in an internal pocket, and may perform an external cutting function by being mounted in an external pocket, and as a result, the single cutting insert may be used for all multiple cutting processes.

In addition, the cutting insert for an indexable drill according to the present disclosure has an optimized inclination angle in a radial direction, thereby reducing a cutting load and improving surface roughness.

DESCRIPTION OF DRAWINGS

FIG. 1 is a view for explaining a cutting insert for an indexable drill according to an exemplary embodiment of the present disclosure.

FIGS. 2 to 4 are a top plan view, a side view, and a front view for explaining the cutting insert for an indexable drill according to the exemplary embodiment of the present disclosure.

FIG. 5 is a cross-sectional view taken along line A-A of FIG. 2.

FIG. 6 is a cross-sectional view taken along line B-B of FIG. 2.

FIG. 7 is a view for explaining an example in which the cutting insert for an indexable drill according to the exemplary embodiment of the present disclosure is installed on a drill body of an indexable drill.

FIG. 8 is a view for explaining a portion which is worn when the cutting insert for an indexable drill according to the exemplary embodiment of the present disclosure performs a cutting process.

FIG. 9 is a view for explaining an interior angle of an external side surface of the cutting insert for an indexable drill according to the exemplary embodiment of the present disclosure.

FIG. 10 is a view for explaining an interior angle of the external side surface of the cutting insert for an indexable drill according to the exemplary embodiment of the present disclosure.

FIG. 11 is a picture for evaluating processing quality of the cutting insert according to the exemplary embodiment of the present disclosure in comparison with a cutting insert according to a Comparative Example.

DESCRIPTION OF MAIN REFERENCE NUMERALS OF DRAWINGS

100: Cutting insert
110: Reference surface
112: Front reference surface
114: Rear reference surface
116: Fastening hole
120: Internal side surface
122: Internal point
124: Internal transition cutting edge
126a, 126b: First and second internal cutting edges
130: External side surface
130a, 130b: First and second external side surfaces
132a: External point edge
132b: External point
134: External transition cutting edge
136a, 136b: First and second external cutting edges
141, 142: First and second corner cutting edges
151: Flat land
152: Negative land
160: Chip breaker
200: Drill body
210: Flute
220: Tip portion
231, 232: First and second pockets
240: Chip pocket
250: Oil hole
300: Workpiece
310: Inner circumferential surface of cutting hole

[Best Mode]

Advantages and features of the present disclosure and methods of achieving the advantages and features will be clear with reference to exemplary embodiments described in detail below together with the accompanying drawings.

Hereinafter, an exemplary embodiment of the present disclosure will be described in detail with reference to the accompanying drawings. It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

Meanwhile, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

Hereinafter, a cutting insert for an indexable drill according to an exemplary embodiment of the present disclosure will be described with reference to FIGS. 1 to 6. The attached FIG. 1 is a view for explaining the cutting insert for an indexable drill according to the exemplary embodiment of the present disclosure. FIGS. 2 to 4 are a top plan view, a side view, and a front view for explaining the cutting insert for an indexable drill according to the exemplary embodiment of the present disclosure. FIG. 5 is a cross-sectional view taken along line A-A of FIG. 2. FIG. 6 is a cross-sectional view taken along line B-B of FIG. 2.

A cutting insert 100 according to the exemplary embodiment of the present disclosure may include reference surfaces 110, internal side surfaces 120, and external side surfaces 130. In addition, a chip breaker 160 may be formed at one side of the reference surface 110. The chip breaker 160 serves to cut a chip into pieces having an appropriate size.

The reference surfaces 110, the internal side surfaces 120, and the external side surfaces 130 may have the same shapes before and after rotating the cutting insert 100 by 180°. In addition, the reference surfaces 110, the internal side surfaces 120, and the external side surfaces 130 may have the same shapes before and after reversing the front and rear sides of the cutting insert 100.

That is, the cutting insert 100 according to the exemplary embodiment of the present disclosure may be implemented as a double type cutting insert that uses two surfaces.

The reference surfaces 110 include a front reference surface 112 formed on a front surface of the cutting insert 100, and a rear reference surface 114 formed on a rear surface of the cutting insert 100.

In addition, since the reference surfaces 110 have the same shape when reversing the cutting insert 100 as described above, the front reference surface 112 and the rear reference surface 114 are disposed to have a rotationally symmetrical relationship.

Meanwhile, the reference surface 110 may have a fastening hole 116 that penetrates the front reference surface 112 and the rear reference surface 114.

In a top plan view illustrating a front side of the reference surface 110, the internal side surfaces 120 may be formed at both left and right sides, respectively. Here, the plurality of internal side surfaces 120 may have the same shape even before and after inverting or reversing the cutting insert 100.

Meanwhile, internal transition cutting edges 124 may be formed at edges of the internal side surfaces 120. In addition, first and second internal cutting edges 126a and 126b may be formed at the edges of the internal side surfaces 120 at both sides based on the internal transition cutting edges 124.

In a top plan view illustrating the front side of the reference surface 110, the external side surfaces 130 may be formed at both upper and lower sides, respectively. Here, the plurality of external side surfaces 130 may have the same shape even before and after inverting or reversing the cutting insert 100.

Meanwhile, external point edges 132a may be formed at centers of the external side surfaces 130. In addition, the external side surfaces 130 may include first and second external side surfaces 130a and 130b which are formed at both sides based on the external point edges 132a, respectively. In addition, external transition cutting edges 134 may be formed at edges of the first external side surfaces 130a, and first and second external cutting edges 136a and 136b may be formed at both sides of the external transition cutting edge 134 based on the external transition cutting edge 134.

Therefore, the cutting insert 100 according to the exemplary embodiment of the present disclosure has a quadrangular external shape as illustrated in FIG. 2, but may seem to have a hexagonal shape because the first and second external cutting edges 136a and 136b are formed on the external side surfaces 130.

Meanwhile, in a top plan view illustrating the front side of the reference surface 110, a first angle a1 formed between the first internal cutting edge 126a and the first external cutting edge 136a may equal to a second angle a2 formed between the second internal cutting edge 126b and the second external cutting edge 136b.

The first and second angles a1 and a2 may be 93° to 100°. If the first and second angles a1 and a2 are larger than 93°, the external point edge 132a may be meaningfully formed.

In addition, if the first and second angles a1 and a2 are smaller than 100°, it is possible to prevent the external point edge 132a from having an excessively pointed shape.

The meaningfully formed external point edge 132a means that the external point edge 132a becomes clearly sharp.

On the other hand, a first corner cutting edge 141 may be formed at a corner portion formed between the first internal cutting edge 126a and the first external cutting edge 136a. Likewise, a second corner cutting edge 142 may be formed at a corner portion formed between the second internal cutting edge 126b and the second external cutting edge 136b.

In addition, an internal point 122 may be formed at a boundary between the second corner cutting edge 142 and the second internal cutting edge 126b. The internal point 122 serves to maintain a balance of the indexable drill during a cutting process.

On the other hand, as illustrated in FIG. 2, in the cutting insert 100 according to the exemplary embodiment of the present disclosure, a first width w1 of the internal side surface 120 may be different from a second width w2 of the external side surface 130.

Therefore, it is possible to easily, intuitively, and visually recognize which is the internal side surface 120 and which is the external side surface 130.

In particular, it is possible to accurately and quickly mount the pair of cutting inserts 100 on a drill body 200 without confusion about whether the cutting insert 100 is used for the purpose of internal cutting or external cutting.

On the other hand, in the cutting insert 100 according to the exemplary embodiment of the present disclosure, the first width w1 of the internal side surface 120 may be larger than the second width w2 of the external side surface 130.

Therefore, when a user mounts the cutting inserts 100 into first and second pockets 231 and 232 of the drill body 200, the user may sensorially recognize a direction in which the cutting insert 100 is mounted.

On the other hand, in the cutting insert 100 according to the exemplary embodiment of the present disclosure, a ratio between the first width w1 of the internal side surface 120 and the second width w2 of the external side surface 130 may be 1:1.05 to 1:1.3. Therefore, as described above, it is possible to accurately mount the cutting insert 100 in the first pocket 231 or the second pocket 232 without confusing a direction in which the cutting insert 100 is intended to be mounted.

On the other hand, as described above, the internal side surface 120 has a longer length, such that when the internal side surface 120 is involved in a cutting process, a part of the first internal side surface 126a is not involved in the cutting process.

In more detail, when the indexable drill performs a cutting process, the second internal cutting edge 126b of the internal side surface 120 and the second external cutting edge 126b of the external side surface 130 are involved in the cutting process. Here, in the case of the cutting insert 100 which is disposed adjacent to the centerline CL, the first corner cutting edge 141, which is formed adjacent to the first internal cutting edge 126a, is not involved in the cutting process. Instead, in the case of the cutting insert 100 which is disposed far from the centerline CL, the first corner cutting edge 141 is not involved in the cutting process.

Therefore, since the width w1 of the internal side surface 120 is much larger than a width of the external side surface 130, whether a part of the first internal cutting edge 126a is involved in the cutting process or not may be more clearly distinguished in accordance with a shape in which the cutting insert 100 is disposed on the indexable drill. Therefore, when viewed from the front reference surface 112, a total of four cutting edges, which include the two first corner cutting edges 141 and the two second corner cutting edges 142, is provided, and when viewed from the rear reference surface 114, a total of four cutting edges, which include the two first corner cutting edges 141 and the two second corner cutting edges 142, is provided.

That is, the cutting insert 100 according to the exemplary embodiment of the present disclosure is an 8-corner product that may use a total of eight corners for a cutting process, which include four corners at the front side and four corners at the rear side.

On the other hand, in the case of the cutting insert 100, if a ratio between the first width w1 of the internal side surface 120 and the second width w2 of the external side surface 130 is equal to or less than 1:1.05 or above 1:1.3, a processing balance becomes poor, and surface roughness deteriorates.

In addition, in the case of the cutting insert 100, if the ratio between the first width w1 of the internal side surface 120 and the second width w2 of the external side surface 130 is equal to or more than 1:1.3, the cutting insert 100 may be excessively increased in size, and as a result, there is concern that durability of a tip portion 220 of the drill body 200 to which the cutting insert 100 is to be fastened will deteriorate. Therefore, in the case of the cutting insert 100, the ratio between the first width w1 of the internal side surface 120 and the second width w2 of the external side surface 130 needs to be equal to or less than 1:1.3.

On the other hand, in the cutting insert 100 according to the exemplary embodiment of the present disclosure, the internal transition cutting edge 124 and the external transition cutting edge 134 are formed, such that a size of the cutting chip may be decreased, and cutting chips may be more smoothly discharged.

Meanwhile, as illustrated in FIGS. 3 and 4, the internal transition cutting edge 124 and the external transition cutting edge 134 may be formed to have twenty-first and twenty-second obtuse angles (see d1 and d2) with respect to the reference surface 110. In more detail, in a side view illustrating a front side of the internal side surface 120, the internal transition cutting edge 124 may be formed to have the twenty-first obtuse angle d1 with respect to the reference surface 110.

In addition, in a side view illustrating a front side of the external side surface 130, the external transition cutting edge 134 may be formed to have the twenty-second obtuse angle d2 with respect to the reference surface 110.

The twenty-first and twenty-second obtuse angles d1 and d2 may be 90.5° to 178°. If the twenty-first and twenty-second obtuse angles d1 and d2 are smaller than 90.5°, there may be a problem in that it is difficult to manufacture the cutting insert through a press-insert manufacturing method.

In addition, if the twenty-first and twenty-second obtuse angles d1 and d2 are larger than 178°, an oblique line section is decreased, such that an effect of reducing a cutting load may deteriorate. Therefore, as described above, the twenty-first and twenty-second obtuse angles d1 and d2 may be 90.5° to 178°.

On the other hand, as illustrated in FIGS. 3 to 5, in a side view illustrating a front side of the internal side surface 120, the reference surface 110 of the cutting insert 100 according to the exemplary embodiment of the present disclosure may be formed to be higher than the first and second internal cutting edges 126a and 126b or the first and second external cutting edges 136a and 136b.

Therefore, when the cutting insert 100 is placed on a flat surface, the cutting edge portions are not in direct contact with the flat surface, thereby protecting the cutting edges.

In addition, since the front reference surface 112 or the rear reference surface 114 has a flat shape, the cutting insert 100 may be placed on a surface plate, and the cutting insert 100 does not sway, thereby more accurately managing dimensions of the cutting edges.

On the other hand, in the cutting insert 100 according to the exemplary embodiment of the present disclosure, the first internal cutting edge 126a may have a flat land 151 that forms a right angle e with respect to the internal side surface 120 as illustrated in FIG. 5, and a negative land 152, which forms a first obtuse angle f with respect to the internal side surface 120, may be formed at partial sections of the first internal cutting edge 126a as illustrated in FIG. 6.

As described above, a part of the first internal cutting edge 126a is formed as the negative land 152.

In addition, in the cutting insert 100 according to the exemplary embodiment of the present disclosure, a length w3 of the negative land 152 may be 0.05 to 0.3 times the first width w1.

If the length w3 of the negative land 152 is smaller than 0.05 times the first width w1, it may be difficult to expect an effect of reinforcing the cutting edge. A damage rate of the cutting edge may be reduced because the negative land has an effect of reinforcing the cutting edge, but if the length w3 of the negative land 152 becomes larger than 0.3 times the first width w1, there is concern that a cutting load will be increased. Therefore, the length w3 of the negative land 152 may be 0.05 to 0.3 times the first width w1.

In addition, in the cutting insert 100 according to the exemplary embodiment of the present disclosure, in a side view illustrating a front side of the external side surface 130, a third angle c, c1, or c2 formed between the first external cutting edge 136a and the reference surface 110 may be 2° to 15° as illustrated in FIG. 4.

Therefore, the first corner cutting edge 141 substantially acts as an external cutting edge, and the inclination angle RR of the first corner cutting edge 141 in a radial direction is decreased as illustrated in FIG. 10, such that a cutting load is decreased when performing a cutting process, and it is possible to expect that a cutting processing surface will have excellent surface roughness.

The surface roughness may be in respect to the processing quality as illustrated in FIG. 11. FIG. 11A is a view for explaining an example in which a cutting process is carried out by a cutting insert according to a Comparative Example. FIG. 11B is a view for explaining an example in which a cutting process is carried out by the cutting insert 100 according to the exemplary embodiment of the present disclosure. As illustrated in FIGS. 11A and 11B, it can be seen that the surface of the Comparative Example is very rough. In contract, the exemplary embodiment according to the present disclosure exhibits relatively better surface roughness in comparison with the Comparative Example. That is, it can be seen that processing quality is improved when a cutting process is carried out by the cutting insert 100 according to the exemplary embodiment of the present disclosure.

More specifically, if the third angle c, c1, or c2 is smaller than 2°, an effect of decreasing the exterior angle RR is decreased in half, and as a result, an effect of improving surface roughness may be decreased in half. Accordingly, the third angle c, c1, or c2 may be larger than 2°. In addition, if the third angle c, c1, or c2 is larger than 15°, durability of the cutting edge may deteriorate. Accordingly, the third angle c, c1, or c2 may be smaller than 15°.

In FIG. 10, reference numeral 300 indicates a workpiece, and reference numeral 310 indicates an inner circumferential surface of a hole formed in the workpiece. As illustrated in FIG. 10, the first corner cutting edge 141 of the cutting insert 100 comes into contact with the inner circumferential surface 310 in a nearly radial direction, and the internal side surface 120 is spaced apart from the inner circumferential surface 310. That is, the inclination angle RR in the radial direction when the indexable drill rotates in a direction indicated by the arrow is formed to be small, such that a cutting load is reduced, and the cutting processing surface is processed so as to have better surface roughness.

On the other hand, it is known that the most vulnerable portion of the indexable drill is positioned in the vicinity of the centerline CL. In the cutting insert 100 according to the exemplary embodiment of the present disclosure, the negative land 152 is position at a portion of the centerline CL which is known as the most vulnerable portion to damage, thereby solving a problem of the vulnerable portion of the cutting insert 100.

Partial sections in which the negative land 152 is formed may be positioned in the vicinity of the center line CL when the drill body 200 rotates based on the center line CL in a state in which the pair of cutting inserts 100 is installed on the drill body 200.

On the other hand, in the cutting insert 100 according to the exemplary embodiment of the present disclosure, in a top plan view illustrating a front side of the reference surface 110, a fourth angle b formed between the first external side surface 130a and the second external side surface 130b may be 160° to 174° as illustrated in FIG. 2. Therefore, an external point 132b may be more clearly formed between the first external cutting edge 136a and the second external cutting edge 136b. The external point 132b serves to maintain a balance when drilling work is carried out.

Meanwhile, if the fourth angle b, b1, or b2 is too small, a web thickness h1 or h2 becomes small, such that durability of the tip portion 220 of the drill body 200 may deteriorate. On the contrary, if the fourth angle b, b1, or b2 is too large, the external point 132b may become blunt, such that it may be impossible to maintain a balance.

Therefore, in a case in which the fourth angle b is larger than 160°, it is possible to prevent durability of the drill body 200 from deteriorating, and in a case in which the fourth angle b is smaller than 174°, it is possible to keep the external point 132b sharp. If the fourth angle b is larger than 174°, the external point 132b is not formed, such that the external side surface 130 may be formed in a nearly flat shape, and accordingly, the fourth angle b may be smaller than 174° as described above.

The fourth angle b and durability of the drill body 200 will be described with reference to FIGS. 7 and 9.

The drill body 200 has two flutes 210, and first and second pockets 231 and 232 are formed at tips of the flutes 210, respectively. The first pocket 231 may be formed to be close to the center line CL, and the second pocket 232 may be formed to be relatively far from the center line CL.

The cutting insert 100 is installed in the first pocket 231 so that the first and second internal cutting edges 126a and 126b of the cutting insert 100 are involved in a cutting process.

In addition, the cutting insert 100 is installed in the second pocket 232 so that the first and second external cutting edges 136a and 136b are involved in the cutting process.

In more detail, the first pocket 231 allows the cutting insert 100 to be disposed to be elongated in a horizontal direction, and the second pocket 232 allows the cutting insert 100 to be disposed to be elongated in a vertical direction.

Meanwhile, chip pockets 240 may be formed at lower ends of the first and second pockets 231 and 232 so as to be connected with the flutes 210, respectively.

In addition, an oil hole 250 may be formed in the drill body 200. The oil hole 250 is formed up to the tip portion 220, such that a coolant may be sprayed from the tip portion 220. In addition, the oil hole 250 is formed to be in communication with the first and second pockets 231 and 232, such that the coolant may be sprayed to the cutting insert 100 for internal cutting and the cutting insert 100 for external cutting.

The first pocket 231 and the second pocket 232 are formed at the tip portion 220 as described above, and the web thicknesses h1 and h2 may be formed between the first pocket 231 and the second pocket 232.

Meanwhile, the shapes of the first and second pockets 231 and 232 are closely associated with an external shape of the cutting insert 100. That is, if the fourth angle b or b1 of the cutting insert 100 is large, the web thickness h1 may be large as illustrated in FIG. 9A. In contrast, if the fourth angle b or b2 of the cutting insert 100 is small, the web thickness h2 may be small as illustrated in FIG. 9B.

The web thicknesses h1 and h2 are associated with rigidity of the drill body 200. Therefore, because rigidity of the indexable drill deteriorates if the web thicknesses h1 and h2 are too small, an appropriate thickness needs to be ensured as described above. Accordingly, the cutting insert 100 according to the exemplary embodiment of the present disclosure has been researched for a long period of time, such that an appropriate value of the fourth angle b, b1, or b2 of the cutting insert 100 is set to be larger than 160° and smaller than 174°.

On the other hand, as illustrated in FIG. 7, the pair of cutting inserts 100 may be mounted in the drill body 200 so that the internal point 122 of the cutting insert 100, which is disposed to be close to the centerline CL, further protrudes than the external point 132b of the cutting insert 100 which is disposed to be relatively far from the center line CL.

A degree g to which the internal point 122 of the cutting insert 100 further protrudes may be 0.3 mm or less. That is, as illustrated in FIG. 8B, when the cutting insert 100 for internal cutting is reversed by 180°, the internal point 122 of the cutting insert 100 is disposed further toward the outside than the second corner cutting edge 142 of the cutting insert 100 for external cutting. Therefore, it becomes more clear that the second corner cutting edge 142 of the cutting insert 100 disposed for external cutting is not involved in a cutting process.

As described above, according to the cutting insert 100 according to the exemplary embodiment of the present disclosure, it is possible to clearly distinguish between which cutting edge is involved in a cutting process and which cutting edge is not involved in a cutting process, and as a result, when the cutting insert 100 is mounted after being inverted or reversed, the cutting process may be carried out by the cutting edge which was not involved in the cutting process.

An additional description will be made as follows.

In a case in which the cutting insert 100 for internal cutting is mounted in the first pocket 231, a cutting edge, which is formed by a part of the first internal cutting edge 126a, the second internal cutting edge 126b, and the second corner cutting edge 142, is involved in a cutting process. Further, the cutting insert 100 may be used for internal cutting after being rotated by 180° about the fastening hole 116. In addition, the cutting insert 100 may be used for internal cutting after being reversed and mounted. In addition, the cutting insert 100 may be used for internal cutting after being rotated by 180° about the fastening hole 116 in a reversed state.

In addition, in a case in which the cutting insert 100 for external cutting is mounted in the second pocket 232, a cutting edge, which is formed by the first corner cutting edge 141, the first external cutting edge 136a, and a part of the second external cutting edge 136b, is involved in a cutting process. Further, the cutting insert 100 may be used for external cutting after being rotated by 180° about the fastening hole 116. In addition, the cutting insert 100 may be used for external cutting after being reversed and mounted. In addition, the cutting insert 100 may be used for external cutting after being rotated by 180° about the fastening hole 116 in a reversed state.

The exemplary embodiment of the present disclosure has been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and is not limited, and the scope of the present disclosure shall be represented by the claims to be described below, and it should be construed that all of the changes or modified forms induced from the meaning and the scope of the claims, and an equivalent concept thereto are included in the scope of the present disclosure.

INDUSTRIAL APPLICABILITY

The cutting insert for an indexable drill according to the present disclosure may be used to process a hole in a workpiece.

The invention claimed is:

1. A cutting insert for an indexable drill, comprising:
opposing front and rear reference surfaces and a peripheral surface extending therebetween, the peripheral surface comprising opposing internal side surfaces and opposing external side surfaces, a fastening hole penetrating the front reference surface and the rear reference surface;
in a top plan view of the front reference surface, the internal side surfaces have a first width (w1) and the external side surfaces have a second width (w2), wherein the first width (w1) and the second width (w2) are different from each other;
each external side surface includes a first external side surface, a second external side surface and an external point surface located in-between the first and second external side surfaces, the external point surface is also located at a center of each respective external side surface;
a front external cutting edge at an intersection of the front reference surface and each of the external side surfaces, a rear external cutting edge at an intersection of the rear reference surface and each of the external side surfaces, each of the front and rear external cutting edges includes a first external cutting edge, a second external cutting edge, an external point edge formed at the center of each respective external side surface, and an external transition cutting edge located in-between the first and second internal cutting edges;
a front internal cutting edge at an intersection of the front reference surface and each of the internal side surfaces, a rear internal cutting edge at an intersection of the rear reference surface and each of the internal side surfaces, each of the front and rear internal cutting edges includes a first internal cutting edge, a second internal cutting edge, and an internal transition cutting edge located in-between the first and second internal cutting edges;
in the top plan view of the front reference surface, a first angle (a1) is formed between the first internal cutting edge of a respective internal cutting edge and the first external cutting edge of a respective external cutting edge, a second angle (a2) is formed between the second internal cutting edge of the opposite internal cutting edge and the second external cutting edge of the respective external cutting, the first angle (a1) and the second angle (a2) are equal;
wherein the cutting insert has 180° rotational symmetry about a longitudinal center axis of the fastening hole;
wherein the cutting insert has 180° rotational symmetry around an axis connecting centers of the internal side surfaces, and the cutting insert has 180° rotational symmetry around an axis connecting the centers of the external side surfaces; and
wherein each first internal cutting edge has a flat land that forms a right angle with respect to a corresponding internal side surface and a negative land that forms a first obtuse angle with respect to the corresponding internal side surface, the negative land is formed in partial sections of the first internal cutting edge.

2. The cutting insert of claim 1, wherein the first width (w1) is larger than the second width (w2).

3. The cutting insert of claim 2, wherein a ratio between the first width (w1) and the second width (w2) is 1:1.05 to 1:1.3.

4. The cutting insert of claim 1, wherein in a side view illustrating a front side of a respective internal side surface, the front and rear reference surfaces are formed to be higher than the first and second internal cutting edges or the first and second external cutting edges.

5. The cutting insert of claim 1, wherein a length (w3) of the negative land is 0.05 to 0.3 times the first width (w1).

6. The cutting insert of claim 1, wherein in a side view illustrating a front side of each respective external side surface, a third angle is formed between each respective first external cutting edge and the front reference surface or the rear reference surface that corresponds with each respective first external cutting edge, the third angle is 2° to 15°.

7. The cutting insert of claim 6, wherein in a top plan view illustrating the front reference surface, a fourth angle (b) is formed between a respective first external side surface and a corresponding second external side surface, the fourth angle is 160° to 174°.

8. The cutting insert of claim 1, wherein the first and second angles (a1, a2) are 93° to 100°.

9. The cutting insert of claim 1, wherein in a side view illustrating a front side of the internal side surfaces, each internal transition cutting edge forms an internal transition obtuse angle with respect to the front reference surface or the rear reference surface that corresponds with each respective internal transition cutting edge;

in a side view illustrating a front side of the external side surfaces, each external transition cutting edge forms an external transition obtuse angle with respect to the front reference surface or the rear reference surface that corresponds with each respective external transition cutting edge; and the internal transition and external transition obtuse angles are 90.5° to 178°.

* * * * *